United States Patent [19]

Loblick

[11] 4,343,058
[45] Aug. 10, 1982

[54] COMPOSITE PNEUMATIC-HYDRAULIC SYSTEM IN A DOCKLEVELLER INSTALLATION

[75] Inventor: Norton M. Loblick, Edmonton, Canada

[73] Assignee: Argo Engineering Ltd., Edmonton, Canada

[21] Appl. No.: 202,487

[22] Filed: Oct. 31, 1980

[51] Int. Cl.³ .............................................. E01D 1/00
[52] U.S. Cl. ................................................... 14/71.7
[58] Field of Search ...................... 14/71.1, 71.3, 71.7; 92/12.1, 13.1, 13.3

[56] References Cited

U.S. PATENT DOCUMENTS

| | | | |
|---|---|---|---|
| 2,626,411 | 1/1953 | Pacmer | 14/71.7 |
| 2,846,703 | 8/1958 | Adley | 14/71.7 |
| 2,881,457 | 4/1959 | Rodgers | 14/71.7 |
| 3,201,814 | 8/1965 | Le Clear | 14/71.7 |
| 3,235,895 | 2/1966 | Wallace | 14/71.7 |
| 3,290,710 | 12/1966 | Whitenack | 14/71.7 |
| 3,694,839 | 10/1972 | Loblick | 14/71.7 |
| 3,694,840 | 10/1972 | Loblick | 14/71.7 |
| 4,257,136 | 3/1981 | Loblick | 14/71.3 |

Primary Examiner—Nile C. Byers, Jr.
Attorney, Agent, or Firm—Max L. Wymore

[57] ABSTRACT

A dockleveller installation is provided having a dockboard hinged for pivotal movement and a composite pneumatic-hydraulic system for pivoting the dockboard. The composite system includes a fluid-filled cylinder attached to the dockboard, a pressurized air supply, and a multiplier connected therebetween. The multiplier is a closed cylindrical member comprising an air cylinder segment connected to the air supply and a fluid cylinder segment connected to the hydraulic cylinder. The interior cross-sectional area of the air segment is greater than that of the fluid segment. The multiplier also includes a double headed piston, one end of which reciprocates and seals in the air segment, the other end of which reciprocates and seals in the fluid segment. This composite system enables pressure to be transferred through the multiplier from the air supply to the hydraulic cylinder, causing the cylinder to open and the dockboard to pivot. The pressure transferred from the air to the fluid is increased by an amount proportional to the ratio of the piston head diameters.

1 Claim, 3 Drawing Figures

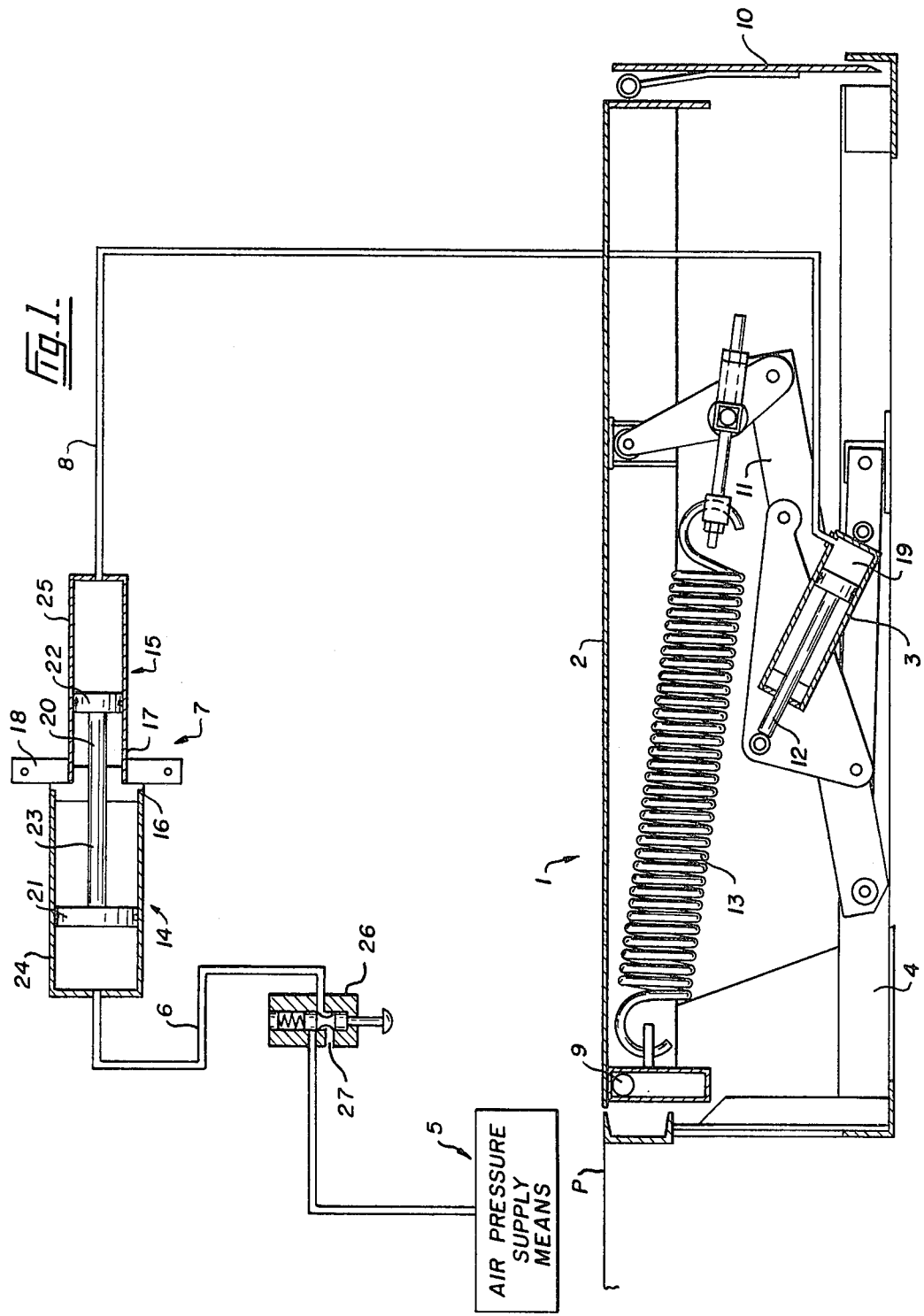

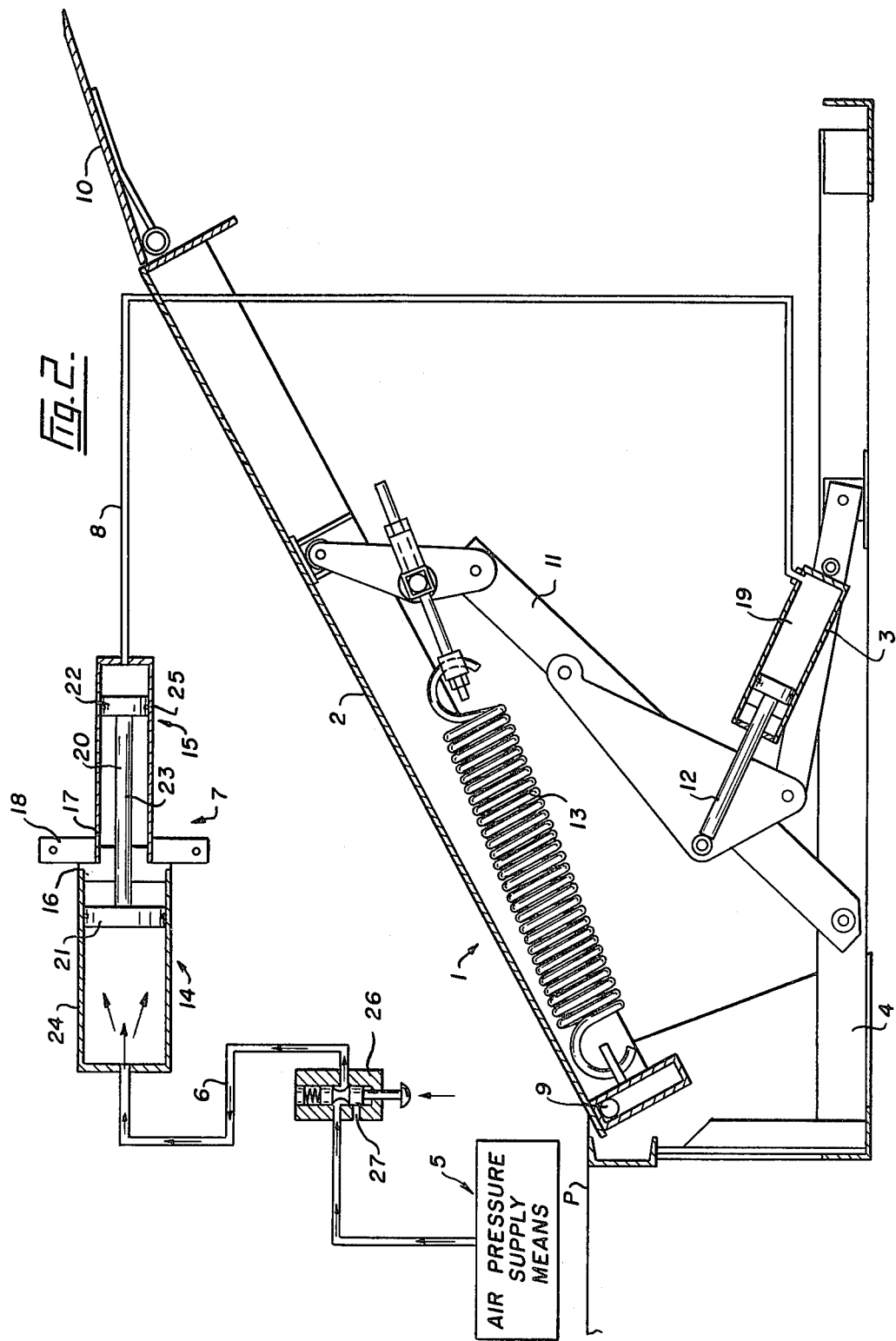

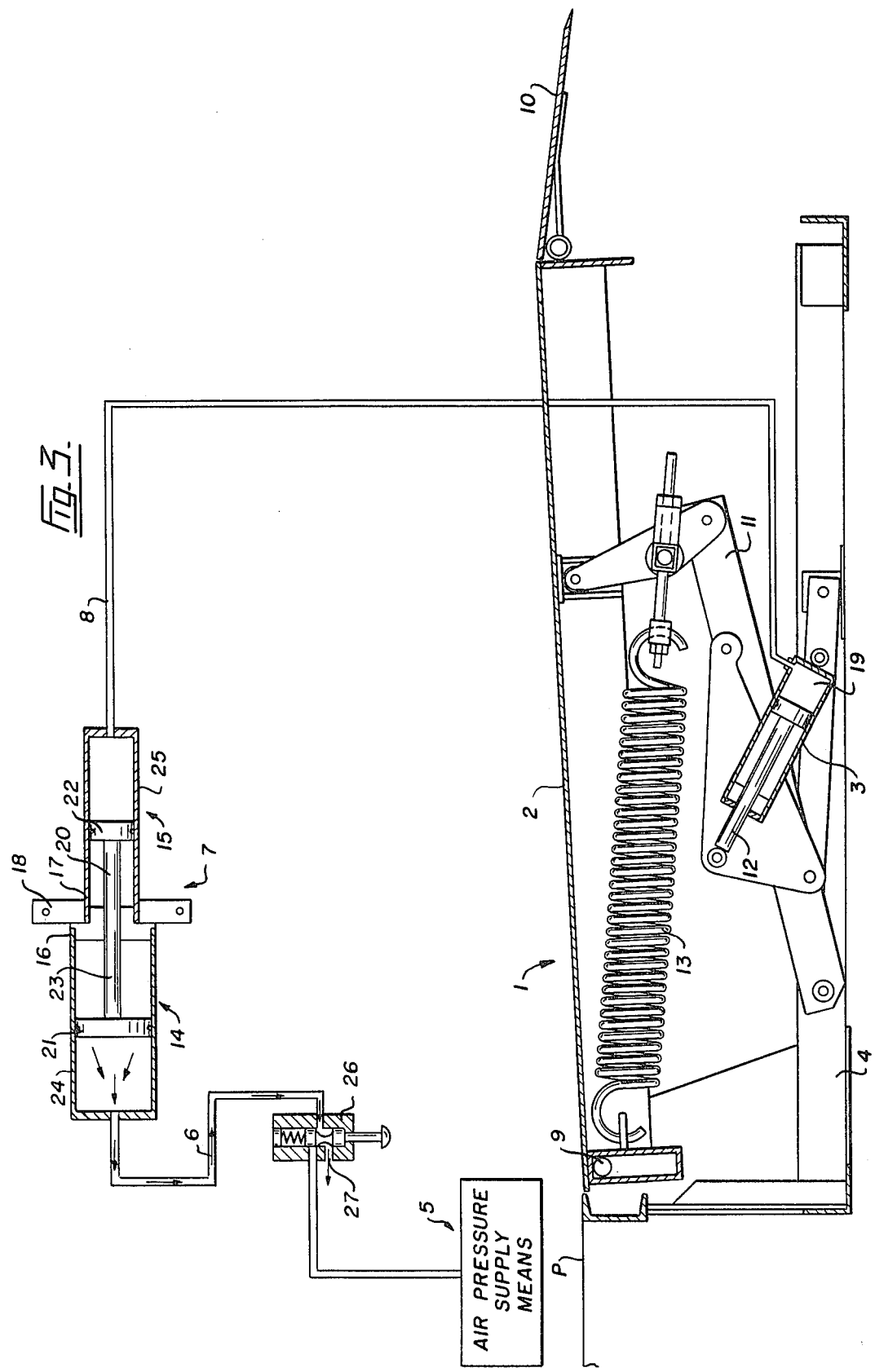

COMPOSITE PNEUMATIC-HYDRAULIC SYSTEM IN A DOCKLEVELLER INSTALLATION

BACKGROUND OF THE INVENTION

1. Field of the Invention

The present invention relates to a dockleveller installation. More particularly, it relates to a dockleveller installation having a hydraulic cylinder, for pivoting the dockboard of the installation between cross-traffic and bridging positions, and to the system for actuating the cylinder.

2. Description of the Prior Art

A dockleveller installation is a device which provides a bridge to span the gap between the surface of a loading dock and the bed of a truck backed up to the dock. The installation includes a dockboard, which is a flat, heavily reinforced platform. This dockboard is hinged at its inner or rear edge to the frame of the installation. Thus it can be pivoted between a horizontal cross-traffic position (in which it forms part of the loading dock surface) and an inclined bridging position.

Means must be provided to pivot or raise the heavy dockboard from the cross-traffic to the bridging position. In most cases such means comprise a hydraulic cylinder, a pneumatic cylinder, or a spring. The present invention is concerned with the cylinder-biased type of installation.

Each of the prior art pneumatic and hydraulic pivoting systems are characterized by both advantages and disadvantages.

Let us consider some of the disadvantages of the hydraulic pivoting system. This system normally comprises an electric motor, a hydraulic pump driven by the motor, a fluid reservoir, and suitable lines and connections completing the system. If the facility (such as a warehouse) requires a number of docklevellers, then a separate motor and pump must be provided for each unit. This is expensive. Also, many working parts are involved, so the likelihood of mechanical failure is high. Another disadvantage of this system is that the reservoir is usually vented to the atmosphere in the facility. This is undesirable in a food-processing plant, as the reservoir emits polluting compounds. Still another disadvantage is that moisture may enter the system through the open reservoir; this can be troublesome if the lines are exposed to freezing temperatures. If the system is to be installed in a harardous area, it is usually necessary to locate the motor and pump outside this area, unless an expensive explosion-proof unit is used. This results in having to provide a long hydraulic line extending from the pump to the dockleveller; there is thus a high pressure drop across this line and the output pressure at the cylinder is correspondingly diminished. Still another disadvantage has to do with the capability of an electric-hydraulic system to build up a high output pressure at the cylinder. If a forklift truck has been left parked partly on the dockboard, and the cylinder is activated, the pressure generated can be sufficient to overturn the truck.

A hydraulic pivoting system is, however, characterized by some positive aspects as well. For example, it may be accurately monitored, controlled and adjusted with respect to the output delivered by the cylinder. This is so because the amount of fluid moving through the line can be closely controlled. Also, it is a reliable system when exposed to freezing temperatures (although, as previously pointed out, problems can arise from the entry of moisture into the lines through the open reservoir).

Use of a pneumatic pivoting system does away with many of the shortcomings of the hydraulic system. For example, a single air compressor can be used to power all the cylinders of a multiple dockleveller facility. Thus lower capital and maintenance costs can be obtained by use of the pneumatic system. In many buildings, an air compressor is already in place and part of its output can be used to power the new dockleveller cylinders. Also, there is no reservoir associated with a pneumatic system, so atmospheric pollution is not a problem. Furthermore, pressure drops due to friction are much reduced in a pneumatic system, as compared to a hydraulic system. Thus long supply lines can be used without disadvantage. In addition, an air system has a built-in accumulator capability which assists in producing a constant and safe pressure output at the cylinder.

Now, while the pneumatic system does have a number of advantages relative to the hydraulic system, it has some disadvantages which have prevented it from achieving commercial success. More particularly, in cold climates customers fear condensation and freeze up in exposed lines. Also, the system does not lend itself to close control and adjustment of the output pressure at the cylinder.

With this background in mind, it is the object of this invention to provide a dockleveller installation, having a cylinder actuating system, which incorporates many of the best features of both the hydraulic and pneumatic systems and which does not have their disadvantages.

SUMMARY OF THE INVENTION

In accordance with the invention, a composite pneumatic-hydraulic system is provided to actuate the cylinder of a dockleveller installation.

More particularly, there is provided an air compressor and a conduit or line connecting it with an interfacing element, which I term a multiplier. The multiplier is a closed cylindrical member having first and second end portions. The first end portion has a larger internal cross-section than the second end portion. The air line is connected with the first end portion for the entry or discharge of pressurized air thereinto or therefrom; a hydraulic conduit or line is connected with the second end portion for the entry or discharge of hydraulic fluid thereinto or therefrom. The hydraulic line is connected with a hydraulic cylinder, which biases the dockboard between cross-traffic and bridging positions. A double-headed piston reciprocates within the multiplier cylindrical member. This piston has a first head member at its first end, which slides within the first end portion and sealably engages it; at its opposite end, the piston has a second head member which slides within the second end portion and sealably engages it; means, such as a rod, rigidly interconnects the head members. The volume between the second head member and the piston of the hydraulic cylinder is filled with hydraulic fluid.

In operation, the air compressor delivers air at a particular pressure/square unit into the first end portion of the multiplier. The double-headed piston is shifted in response to this pressure and forces hydraulic fluid at a higher pressure into the hydraulic cylinder, thereby raising the dockboard.

There are two features incorporated in the invention. Firstly, a novel combination has been made by splicing together pneumatic and hydraulic systems. The composite system is characterized by desirable features of the components but omits undesirable ones. Secondly, this splice has been effected by using a multiplier which converts the relatively low pressure obtained from the compressor into a relatively high pressure—this allows for the higher pressure drop encountered in the hydraulic line.

Broadly stated, the invention involves, in a dockleveller installation, the combination comprising: a dockboard hinged at its inner edge for pivoting movement between cross-traffic and bridging positions; a hydraulic cylinder connected with the dockboard for biasing it between said positions; pressurized air supply means and a first conduit extending therefrom for supplying and exhausting pressurized air; a multiplier comprising connected air and fluid cylinder segments, said segments combining to form a closed cylindrical member, the interior cross-sectional area of the air segment being greater than that of the fluid segment; a double-headed piston disposed in the cylindrical member, said piston having a first piston head which reciprocates within the air segment and sealably engages it, a second piston head which reciprocates within the fluid segment and sealably engages it, and means rigidly interconnecting said piston heads; said first conduit interconnecting the air supply means with the air segment, for supplying pressurized air into said segment and exhausting it therefrom; and a second conduit, interconnecting the fluid segment with the hydraulic cylinder, for supplying pressurized fluid into the cylinder and exhausting it therefrom.

DESCRIPTION OF THE DRAWINGS

FIG. 1 is a sectional schematic view of the dockleveller installation, showing the dockboard in the cross-traffic position with no movement of air or hydraulic fluid;

FIG. 2 is a sectional schematic view showing the dockboard pivoted to a raised position as air pressure, bearing on the hydraulic fluid through the multiplier means, causes the hydraulic cylinder attached to the dockboard to expand; and FIG. 3 is a sectional schematic view of the dockboard as it is being lowered. Fluid from the hydraulic cylinder is transferred back to the multiplier means and air is vented from the opposite side of the multiplier means.

DESCRIPTION OF THE PREFERRED EMBODIMENT

In general, a conventional dockleveller 1 is shown having a dockboard 2 hinged at its inner end for pivotal movement. A hydraulic cylinder 3 is attached to the dockboard 2 and the base frame 4, for raising and lowering the dockboard 2. Pressurized air supply means 5 are connected through a conduit 6 to one end of a multiplier 7. The other end of the multiplier 7 is connected through a conduit 8 to the hydraulic cylinder 3.

As stated, the dockleveller 1 is conventional; therefore it will only be described generally. It includes the base frame 4 which is positioned in a recessed pit formed in the loading platform P. The dockboard 2 is hinged at 9 for movement between cross-traffic and raised positions. A lip extension member 10 is hinged to the outer end of the dockboard 2 for bridging the gap between the dockboard 2 and the truck bed (not shown). An articulated lifting arm 11 pivotally interconnects the dockboard 2 and base frame 4. The piston 12 of the hydraulic cylinder 3 is connected to the lifting arm 11. Expansion and contraction of the cylinder 3, acting through the articulated lifting arm 11, raises and lowers the dockboard 2. A tension spring 13, connecting the rear end of the dockboard 2 with the lifting arm 11, balances the dockboard 2 in the cross-traffic or horizontal position.

Turning now to the multiplier 7, it comprises an air cylinder segment 14 at one end and a fluid cylinder segment 15 at the other end. The interior cross-sectional area of the air segment 14 is greater than that of the fluid segment 15. The cylinder segments 14, 15 are sealed and connected at their inner ends 16, 17 by a junction block 18. The junction block further holds the cylinders 14, 15 in concentric alignment. Together, the segments 14, 15 form a closed cylindrical member. The air segment 14 is connected through the conduit 6 with the air compressor or supply means 5. The fluid segment 15 is connected with the base end chamber 19 of the hydraulic cylinder 3 by the conduit 8.

Operative within the multiplier 7 is a double-headed piston 20. This piston 20 has first and second piston heads 21, 22 interconnected by a rigid rod 23. The first piston head 21 moves within and sealably engages the side wall 24 of the air cylinder segment 14. The second piston head 22 moves within and sealably engages the side wall 25 of the fluid cylinder segment 15.

The pressurized air supply means 5 normally includes a conventional air compressor (not shown), equipped with an air strainer (not shown) and lubricator (not shown) and a two position N/C (normally closed) air control valve 26. The valve 26, in its closed position (FIGS. 1 and 3) permits the air cylinder segment 14 to be vented through an exhaust port 27. In its open position (FIG. 2) the exhaust port 27 is closed, and the air compressor can supply air, through the valve 26 and conduit 6, to the air cylinder segment 14.

The air supply means 5, the conduit 6 and the multiplier 7 may be located inside a warehouse, while the conduit 8 leads outside to the dockleveller 1. Alternatively, the multiplier 7 could be mounted below the dockleveller 1 in the loading platform.

OPERATION

The dockboard 2 is shown in FIG. 1 in its cross-traffic position. The air control valve 26 is closed, and thus air from the air compressor does not reach the multiplier 7. To raise the dockboard 2, the valve 26 is pushed open, as shown in FIG. 2, to allow air from the air compressor to flow through the valve 26 and conduit 6 to the air cylinder segment 14. The pressure of the air acting against the first piston head 21 causes the double-headed piston 20 to move, displacing hydraulic fluid from the fluid cylinder segment 15, through conduit 8, to the hydraulic cylinder 3 in the dockleveller 1. The pressure transferred through the multiplier 7 from the air to the fluid is increased by an amount proportional to the ratio of the two piston head diameters, multiplier by the air pressure applied, neglecting any frictional losses. Generally, a multiplier factor of 1.66, obtained from a ratio of piston areas of 5:3, has been found to be sufficient. The fluid displaced to the hydraulic cylinder 3 causes the latter to expand, pivoting the dockboard 2 upwardly.

The dockboard 2 is initially raised to a height above the level of vehicle bed to be loaded, to enable the lip member 10 to be extended. Thereafter, the dockboard 2 needs to be lowered to a loading position (FIG. 3), wherein the lip member 10 rests on the vehicle bed. To accomplish this, the air control valve 26 is pulled closed, the hydraulic fluid returns to the fluid cylinder segment 15, and air from the air cylinder segment 14 is vented through the open exhaust port 27. When the vehicle drives away, the dockboard 2 falls back to its cross-traffic position.

Generally, an air compressor, to operate a dockleveller, should be capable of producing about 100 psi air pressure. The necessary cubic foot capacity of the compressor depends on the demands on the compressor. Each dockleveller normally requires about 120 cubic inches of air at 90 psi to take it through one lift cycle.

FEATURES AND ADVANTAGES OF THE PREFERRED EMBODIMENT OF THE INVENTION

1. The use of one air compressor, especially in those cases in which existing air compressor is in place, to operate a plurality of docklevellers, can significantly reduce the costs of each dockleveller installation over, for instance, the conventional electric-hydraulic systems.

2. The combined air-hydraulic fluid system of the present invention permits one to isolate the air filled components inside a warehoue and run only hydraulic fluid to the outdoor dockleveller. This overcomes the condensation problems which buyers worry about in the straight air systems.

3. The hydraulic fluid is contained in a closed system, moving back and forth between the multiplier and the hydraulic cylinder. Therefore the fluid does not need to be vented to the atmosphere, as it does in a conventional electric-hydraulic system. Venting a hydraulic fluid reservoir can cause contamination problems in, for example, a food environment.

4. The conventional electric-hydraulic dockleveller installations, as previously mentioned, need an electric pump for each dockleveller. These pumps are designed with a high peak power capacity to overcome the initial inertia of the pump itself. This surge power is transmitted to the dockboard, and is sufficient to lift both the dockboard and any equipment which happens to be on or partially on the dockboard. This often results in damage to the equipment. With the combined air-hydraulic system, air pressure builds up slowly to gradually overcome the initial inertia of the dockboard. Further, the air pressure can be set at a level sufficient to lift only the dockboard.

While the present invention has been disclosed in connection with the preferred embodiment thereof, it should be understood that there may be other embodiments which fall within the spirit and scope of the present invention as defined in the following claims.

The embodiments of the invention in which an exclusive property or privilege is claimed are defined as follows:

1. In a dockleveller installation, the combination comprising:

a dockboard hinged at its inner edge for pivoting movement between cross-traffic and bridging positions;

a hydraulic cylinder connected with the dockboard for biasing it between said positions;

pressurized air supply means and a first conduit extending therefrom for supplying and exhausting pressurized air;

a multiplier comprising connected air and fluid cylinder segments, said segments combining to form a closed cylindrical member, the interior cross-sectional area of the air segment being greater than that of the fluid segment;

a double-headed piston disposed in the cylindrical member, said piston having a first piston head which reciprocates within the air segment and sealably engages it, a second piston head which reciprocates within the fluid segment and sealably engages it, and means rigidly interconnecting said piston heads;

said first conduit interconnecting the air supply means with the air segment, for supplying pressurized air into said segment and exhausting it therefrom; and a second conduit, interconnecting the fluid segment with the hydraulic cylinder, for supplying pressurized fluid into the cylinder and exhausting it therefrom.

* * * * *